UNITED STATES PATENT OFFICE.

PATRICK QUINN, OF EDWARDSDALE, PENNSYLVANIA.

FLUX FOR WELDING METALS.

SPECIFICATION forming part of Letters Patent No. 592,642, dated October 26, 1897.

Application filed August 23, 1897. Serial No. 649,257. (No specimens.)

*To all whom it may concern:*

Be it known that I, PATRICK QUINN, a citizen of the United States, and a resident of Edwardsdale, in the county of Luzerne and State of Pennsylvania, have invented certain new and useful Improvements in Fluxes for Welding Metals; and I do hereby declare that the following is a full, clear, and exact description of the invention, which will enable others skilled in the art to which it appertains to make and use the same.

My invention relates to an improved flux for welding metals, and is more particularly intended for use in welding cast-steel; and it consists in a composition consisting of sal-ammoniac, borax, copperas, rosin, lime, alum, sand, salt, and wheat-flour.

In carrying my invention into effect I take approximately equal parts of sal-ammoniac, borax, copperas, rosin, lime, alum, salt, and sand in a powdered state and thoroughly mixed together and use as a flux in the ordinary manner. The purpose of the sal-ammoniac is to keep the grain of the steel open and keep dirt from working into the metal. The borax tends to keep the metal at a uniform temperature on the outside until the grain of the steel becomes open and hot enough on the inside for welding. The copperas and rosin serve to increase the heat of the fire, while the alum and lime hold the other ingredients on the steel. The salt and sand serve to clear the fire.

I have found by experiment that cast-steel may be readily welded by using the above composition as a flux.

Having fully described my invention, what I claim is—

A flux for welding metals consisting of sal-ammoniac, borax, copperas, rosin, lime, alum, salt, sand and wheat-flour in about the proportions specified.

In testimony that I claim the foregoing as my own I have hereunto affixed my signature in presence of two witnesses.

PATRICK QUINN.

Witnesses:
JEKUB BUCZKES,
JOE WILLAMOWSKI.